United States Patent
Heinrich et al.

(10) Patent No.: US 10,967,597 B2
(45) Date of Patent: Apr. 6, 2021

(54) METHOD AND SYSTEM FOR FEEDING A LUBRICATING OR RELEASING AGENT TO PRESSING TOOLS OF A TABLET PRESS

(71) Applicant: Fette Compacting GmbH, Schwarzenbek (DE)

(72) Inventors: Thomas Heinrich, Stelle (DE); Stefan Meisolle, Wittenburg (DE); Martin Schoeler, Hamburg (DE)

(73) Assignee: Fette Compacting GmbH, Schwarzenbek (DE)

( * ) Notice: Subject to any disclaimer, the term of this patent is extended or adjusted under 35 U.S.C. 154(b) by 565 days.

(21) Appl. No.: 15/829,266

(22) Filed: Dec. 1, 2017

(65) Prior Publication Data

US 2018/0154600 A1 Jun. 7, 2018

(30) Foreign Application Priority Data

Dec. 1, 2016 (DE) .................... 10 2016 123 279.3

(51) Int. Cl.
*B30B 15/00* (2006.01)
*B05B 17/00* (2006.01)
(Continued)

(52) U.S. Cl.
CPC ........ *B30B 15/0011* (2013.01); *B05B 12/084* (2013.01); *B05B 17/0638* (2013.01);
(Continued)

(58) Field of Classification Search
CPC . B30B 15/0011; B30B 15/0082; B30B 11/08; B30B 11/005; B30B 15/00;
(Continued)

(56) References Cited

U.S. PATENT DOCUMENTS 3,029,752 A * 4/1962 Frank .................. B30B 15/0011
425/107
3,158,111 A * 11/1964 Raff ....................... B30B 11/08
264/304
(Continued)

FOREIGN PATENT DOCUMENTS

CA 200855 7/1990
DE 3902293 A1 8/1990
(Continued)

OTHER PUBLICATIONS

EP 17195721; filed Oct. 10, 2017; Fette Compacting GmbH; European Search Report dated May 23, 2018, 5 pages.
(Continued)

*Primary Examiner* — Jeffrey M Wollschlager
(74) *Attorney, Agent, or Firm* — Barclay Damon LLP

(57) ABSTRACT

A method and system for feeding a lubricating or releasing agent from a dosing station to one or more pressing tools arranged in a pressing chamber of a tablet press. The tablet press is configured with a feed pipe for feeding the lubricating or release agent from the dosing station to the one or more pressing tools of a pressing chamber of the tablet press and the feed pipe is configured with a shut-off valve disposed in-line with the feed pip for controlling the flow of the lubricating or release agent to the pressing chamber. The method comprises the steps of: producing a negative pressure with respect to the surroundings of the pressing chamber of the tablet press, measuring a pressure in one of the feed pipe and the pressing chamber, and issuing a signal indicative of the measured pressure and issuing an enable signal to open a valve in response to the pressure signal.

5 Claims, 1 Drawing Sheet

(51) Int. Cl.
    *B05B 12/08*     (2006.01)
    *B30B 11/08*     (2006.01)
    *B30B 11/00*     (2006.01)
    *B29C 33/58*     (2006.01)
    *B29C 37/00*     (2006.01)
    *B29C 43/00*     (2006.01)
    *B29C 43/34*     (2006.01)
    *B29C 33/60*     (2006.01)
    *B29C 43/58*     (2006.01)
    *B29C 43/18*     (2006.01)
    *B05B 7/14*     (2006.01)
    *B05B 14/10*     (2018.01)

(52) U.S. Cl.
    CPC .............. *B29C 33/58* (2013.01); *B29C 33/60* (2013.01); *B29C 37/0071* (2013.01); *B29C 43/006* (2013.01); *B29C 43/183* (2013.01); *B29C 43/34* (2013.01); *B29C 43/58* (2013.01); *B30B 11/005* (2013.01); *B30B 11/08* (2013.01); *B30B 15/0082* (2013.01); *B05B 7/1413* (2013.01); *B05B 14/10* (2018.02); *B29C 2043/345* (2013.01); *B29C 2043/3427* (2013.01); *B29C 2043/3455* (2013.01)

(58) Field of Classification Search
    CPC ..... B30B 15/302; B29C 43/58; B29C 43/183; B29C 33/58; B29C 37/0071; B29C 43/006; B29C 43/34; B29C 33/60; B29C 2043/3455; B29C 2043/3427; B29C 2043/345; B05B 17/0638; B05B 12/084; B05B 14/10; B05B 7/1413
    See application file for complete search history.

(56) References Cited

U.S. PATENT DOCUMENTS

| | | | | |
|---|---|---|---|---|
| 4,362,493 A | * | 12/1982 | Doepel | B30B 11/08 425/345 |
| 4,373,888 A | * | 2/1983 | Yamamoto | B30B 15/0011 425/149 |
| 4,388,343 A | * | 6/1983 | Voss | B05B 5/025 239/4 |
| 4,707,309 A | * | 11/1987 | Voss | B30B 15/0011 264/12 |
| 5,056,623 A | * | 10/1991 | Glasel | B30B 15/0011 184/6.1 |
| 5,356,577 A | * | 10/1994 | Boldis | B05B 12/06 239/8 |
| 5,609,908 A | * | 3/1997 | Voss | B05B 7/066 118/313 |
| 5,624,690 A | * | 4/1997 | Boldis | B05B 12/06 425/100 |
| 5,643,630 A | | 7/1997 | Hinzpeter et al. | |
| 6,079,968 A | | 6/2000 | Schmitz et al. | |
| 6,964,779 B1 | * | 11/2005 | Hayakawa | A61J 3/10 424/465 |
| 7,749,053 B2 | * | 7/2010 | Behns | B30B 15/0082 454/238 |
| 7,766,638 B2 | * | 8/2010 | Watanabe | C04B 41/009 425/103 |
| 2003/0086973 A1 | * | 5/2003 | Sowden | A23G 3/368 424/474 |
| 2004/0096495 A1 | | 5/2004 | Watanabe et al. | |
| 2005/0151292 A1 | | 7/2005 | Shimada et al. | |
| 2006/0157878 A1 | * | 7/2006 | Brisset | B30B 11/08 264/39 |
| 2007/0149108 A1 | * | 6/2007 | Behns | B08B 15/02 454/238 |

FOREIGN PATENT DOCUMENTS

| | | |
|---|---|---|
| DE | 19647089 A1 | 5/1998 |
| EP | 0336198 A2 | 3/1989 |
| EP | 0676280 A1 | 11/1998 |
| EP | 1179414 A1 | 2/2002 |
| EP | 1803508 A2 | 7/2006 |
| JP | 2007098449 A | 4/2007 |
| JP | P2007-525252 A | 9/2007 |

OTHER PUBLICATIONS

JP P2017-214616; JP Office Action dated Feb. 14, 2019; 9 pages.
CN 201711191293.6; CN Office Action dated Mar. 27, 2019; 19 pages.

\* cited by examiner

METHOD AND SYSTEM FOR FEEDING A LUBRICATING OR RELEASING AGENT TO PRESSING TOOLS OF A TABLET PRESS

CROSS REFERENCE TO RELATED INVENTION

This application is based upon and claims priority to, under relevant sections of 35 U.S.C. § 119, German Patent Application No. 10 2016 123 279.3, filed Dec. 1, 2016, the entire contents of which are hereby incorporated by reference.

BACKGROUND

EP Patent 0676280 B1 discloses pressing tools like press plungers or die bores of tablet presses which dust the working components with magnesium stearate (MgSt) or similar materials to improve the yield of tablets and to avoid tableting errors, in particular when products having a propensity to stick to a surface are to be compacted. Feeding the lubricating or releasing agent is usually performed by continuous dosing combined with a pneumatic overpressure for the purpose of transporting the lubricating or releasing agent (fed by air as a carrier medium) to the working area. Clocked dosings are known from EP 0 336 197 A2 and dosing of the liquid or suspended lubricating agents is known from DE 39 022 93 A1 or EP 1 179 414 A1. Moreover, stearate dosings with process-dependent control of the dosing amount along with the additional action of introducing pressurised gas or air directly before the exit of the lubricating agent is described in DE 196 47 089 A1. In all the aforementioned cases, the connection to the tablet press is performed via an open hose line.

Certain tablet presses have an active protection function which is configured to withhold or filter toxic dusts from the surroundings. Such tablet presses are also considered to be containment presses. In order to reach the small expositions required for such containment presses, the pressing chamber is tightly sealed and exposed to a controlled negative pressure with respect to the surroundings. Even with these constraints, it has not been possible to feed a lubricating or releasing agent into the controlled surroundings inasmuch as any opening for feeding the lubricating or releasing agent cannot be performed safely even under the conditions of the containment press.

A need, therefore, exists for a method and a system for feeding a lubricating or releasing agent safely into containment tablet presses.

The foregoing background describes some, but not necessarily all, of the problems, disadvantages and shortcomings related to archery release devices and methods of the prior art

BRIEF SUMMARY OF THE INVENTION

A method and system is provided for feeding a lubricating or releasing agent from a dosing station to one or more pressing tools arranged in a pressing chamber of a tablet press. The tablet press is configured with a feed pipe for feeding the lubricating or release agent from the dosing station to the one or more pressing tools of a pressing chamber of the tablet press and the feed pipe is configured with a shut-off valve disposed in-line with the feed pip for controlling the flow of the lubricating or release agent to the pressing chamber. The method comprises the steps of: producing a negative pressure with respect to the surroundings of the pressing chamber of the tablet press, measuring a pressure in one of the feed pipe and the pressing chamber, and issuing a signal indicative of the measured pressure and issuing an enable signal to open a valve in response to the pressure signal.

Additionally, a system is provided for feeding a lubricating or releasing agent from a dosing station to pressing tools arranged in a pressing chamber of a tablet press. The dosing station is connected to the pressing chamber by a feed pipe and the pressing chamber of the tablet press is exposed to a negative pressure with respect to its surroundings. The system comprises: a pressure measurement device configured to measure the pressure in at least one of the feed pipe and the pressing chamber, a shut-off valve disposed in-line with the feed pipe between the dosing station and the pressing chamber, and a control device configured to open the shut-off valve when an enable signal is issued in response to the pressure measured by the pressure measurement device.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the disclosed subject matter encompasses other embodiments as well. The drawings are not necessarily to scale, emphasis generally being placed upon illustrating the features of certain embodiments of the invention. In the drawings, like numerals are used to indicate like parts throughout the various views. They show schematically.

DETAILED DESCRIPTION OF THE INVENTION

The present invention relates to a method for feeding a lubricating or releasing agent from a dosing station to pressing tools arranged in a pressing chamber of a tablet press via a feed pipe connecting the dosing station with the pressing chamber, wherein at least the pressing chamber of the tablet press is exposed to a negative pressure with respect to the surroundings.

In addition, the invention relates to a system for feeding a lubricating or releasing agent from a dosing station to pressing tools arranged in a pressing chamber of a tablet press via a feed pipe connecting the dosing station with the pressing chamber, wherein at least the pressing chamber of the tablet press is exposed to a negative pressure with respect to the surroundings.

For the method of the aforementioned kind, pressure measurement is performed in the feed pipe and/or the pressing chamber. Furthermore, a shut-off valve is disposed in-line with the feed pipe between the dosing station and the pressing chamber. The shut off valve is opened, and maintained in an open position, when an enable signal is issued in response to the measured pressures.

For a system of the aforementioned kind, the pressure measurement device is provided for pressure measurement in the feed pipe and/or in the pressing chamber. A shut-off valve is disposed in-line with the feed pipe between the dosing station and the pressing chamber. A control device is configured to open the shut-off valve, and to maintain it in an open position if an enable signal is issued in response to a pressure measured by the pressure measurement device.

Figure 1:
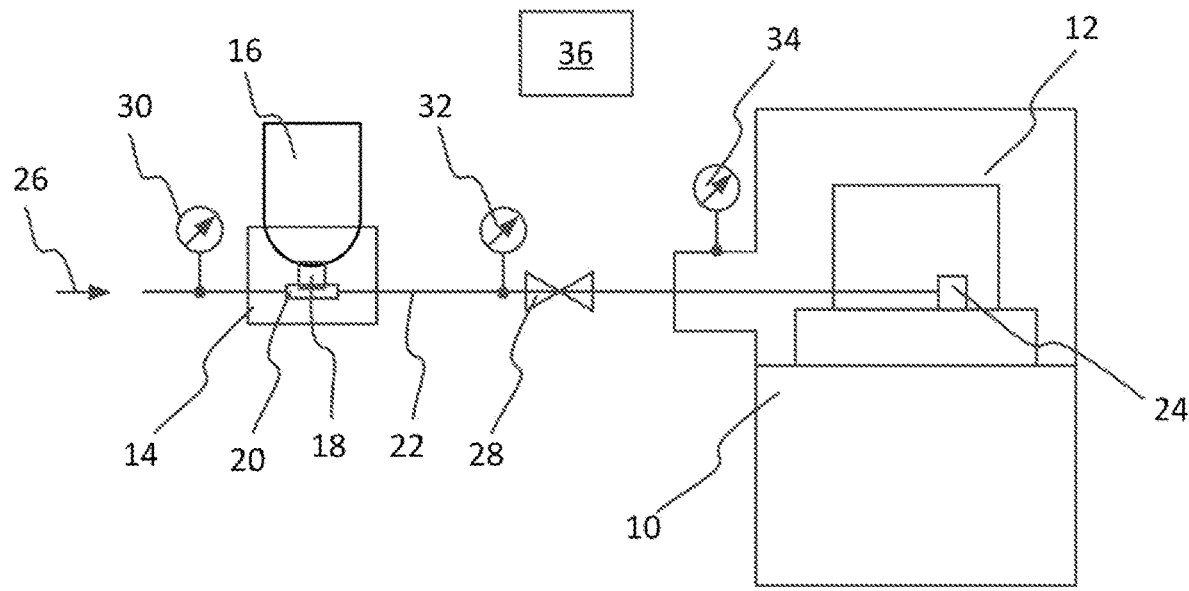
FIG. 1 is a simplified schematic diagram of one embodiment of a system for feeding a lubricating or release agent to the press components of a tablet.

In FIG. 1, a tablet press, or in this embodiment a rotary tablet press 10, is schematically shown. The tablet press 10 is a containment press or a high pressure containment press. The tablet press 10 has a pressing chamber 12 which includes, inter alia, a rotor pressing tool e.g., pressing plungers and die bores, etc. At least the pressing chamber 12 of the tablet press 10 is exposed to a negative pressure or vacuum with respect to the ambient conditions or surroundings. For this purpose, at least the pressing chamber 12 is sealed with respect to the surroundings and includes an aspiration device (not shown) connected to at least the pressing chamber 12, for evacuating or aspirating air from the pressing chamber 12 in order to maintain the negative pressure or vacuum.

A dosing station 14 is provided for supplying a lubricating or releasing agent to the compression tools of the tablet press 10. The lubricating or release agent of the dosing station 14 is contained in a reservoir 16, which is connected via an inlet 18 to a venturi nozzle 20. The venturi nozzle 20 is disposed within, and in-line with, a feed pipe 22 which enters the tablet press 10 and the pressing chamber 12 and leads to an applying device 24. The feed pipe 22 is securely connected to the pressing chamber 12 of the tablet press 10 in the framework of the requirements for the pressurized/containment surroundings of the tablet press 10. A pneumatic device (not shown) such as a pump feeds a gaseous medium such as, for instance air, under pressure into the feed pipe 22. The gaseous medium is introduced upstream of the dosing station 14 at arrow 26 as shown in FIG. 1. Accordingly, an overpressure condition is produced with respect to the surroundings of the feed pipe 22. The supplied gaseous medium flows through the venturi nozzle 20, wherein a negative pressure is created in the cross-section narrowing, or throat, of the venturi nozzle 20. As a consequence, the lubricating or release agent is aspirated or aerated upon exiting the lubricating/release reservoir 16. When a shut-off valve 28, disposed along the feed pipe 22 is open, a mixture of gaseous medium and the lubricating or releasing agent flows to an applying device or applicator 24 of the dosing station 14. The applying device or applicator 24 dusts the pressing tools of the tablet press 10 with the lubricating or releasing agent contained in the gaseous medium.

A pressure sensor 30, disposed upstream of the reservoir 16, measures the dynamic pressure before aspiration of the lubricating or release agent. A pressure sensor 32 is disposed in-line with the feed pipe 22 at a location between the reservoir 16 and a shut-off valve 28. Operationally, the second pressure sensor 32 measures the pressure in the feed pipe 22 following aspiration of the lubricating or release agent and before the shut-off valve and the dosing station 14. Moreover, the second pressure sensor 34 measures the chamber pressure in the pressing chamber 12 of the tablet press 10.

The pressure sensors 30, 32 and 34 are part of a pressure measurement subsystem of the tablet press system according to the present invention. As mentioned in the preceding paragraph, the pressure sensors 30 and 32 form first pressure sensors, while the pressure sensor 34 defines a second pressure sensor. In the described embodiment, the measured pressure values of the pressure sensors 30, 32 and 34 are issued to a signal processor or controller 36. The controller 36 generates an enable signal to open the shut-off valve 28 in response to a predetermined combination of pressure measurement signals or when predetermined conditions exist. When the enable signal is issued, the control device 36 opens the shut-off valve 28, so that lubricating or releasing agents can be supplied to the compression tools of the tablet press 10. The control device 36 maintains the shut-off valve 28 in an open position during the operation of the tablet press 10, i.e., for at least as long as the first and second pressure values are issued by the controller 36. In case that the enable signal is no longer issued by the controller 36, i.e., because one of the predetermined pressure signals no longer reaches a predetermined threshold value, the control device 36 disables or closes the shut-off valve 28.

Figure 2:
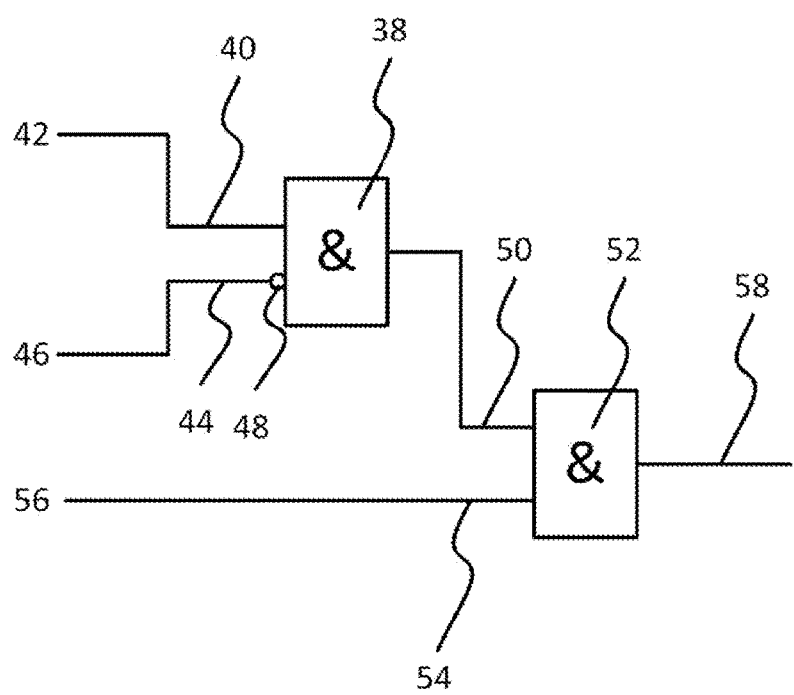
FIG. 2 is a simplified schematic view of an algorithm processed by a control device to issue an enable signal for aspirating the lubricating or release agent when operating the tablet press.

The pressure signals which generate the enable signal is explained in greater detail by reference to FIG. 2 which depicts an algorithmic logics diagram. A first AND-operator 38 is shown in FIG. 2 which compares the values of the first and second pressure signals issued on input lines 40 and 42, respectively. If the pressure measured by the pressure sensor 32 (i.e., the pressure of the gaseous mixture following aspiration and downstream of the reservoir 16) is greater or higher than the pressure measured by the pressure sensor 34 by a given first limit pressure, or a first pressure threshold amount, than a comparison signal 42 is issued, or is existent, (resulting in a digital condition 1). When the aforementioned condition is not satisfied, the comparison signal 42 is not issued or existent (resulting in a digital condition 0).

A second comparison signal 46 is applied to the second input 44 of the first AND-operator 38, this signal being applied inversely, like that shown at reference sign 48. This comparison signal 46 results from a comparison of the pressing chamber pressure measured by pressure sensor 34, with a second limit pressure. In case the pressing chamber pressure exceeds the predetermined second limit pressure, the comparison signal 46 is issued or existent (digital condition 1). In the event that the pressing chamber pressure does not exceed the predetermined second limit pressure, the comparison signal 46 is not issued or existent. (digital condition 0).

Because the comparison signal 46 is inversely (48) applied to the first AND-operator 38, as was explained above, the first AND-operator generates an output signal provided that: (i) the pressure in the feed pipe 22, measured by the pressure sensor 32, is higher than the pressing chamber pressure and (ii) the pressing chamber pressure does not exceed the a predetermined second limit pressure.

The output signal of the first AND-operator 38 is applied to the first input 50 of a second AND-operator 52. A comparison signal 56 is applied to the second input 54 of the second AND-operator 52. This comparison signal results from a comparison between the dynamic pressure before the dosing station 14 (measured by the pressure sensor 30) and the pressing chamber pressure in the pressing chamber 12 (measured by the pressure sensor 34.) The comparison signal 56 is issued or existent (digital signal 1) when the measured dynamic pressure, before the dosing device 14, is higher than the pressing chamber pressure by an amount equal to a predetermined first limit pressure. Otherwise, the comparison signal 56 will not be issued or existent (digital condition 0).

Thus, the second AND-generator 52 generates an output signal 58 (digital condition 1), provided that the first AND-operator 38 puts out an output signal (digital condition 1) or provided that the dynamic pressure before the dosing station 14 is higher than the pressing chamber pressure about the first limit pressure.

The output signal 58 of the second AND-operator 52 is issued or existent (digital condition 1), when the enable signal for opening or keeping open the shut-off valve 28 is existent. On the contrary, if the output signal 58 of the second AND-operator 52 is not issued or existent (digital condition 0), the enable signal is not issued or existent and the control device 36 closes the shut-off valve 28 and keeps it closed.

The algorithm shown in FIG. 2 may be integrated into the control device 36 in particular. That is, the algorithm may be processed by the control device 36 to issue an enable signal for aspirating or aerating the lubricating or release agent when operating the tablet press of the present invention.

The present invention provides pressure monitoring by dusting pressing tools using a lubricating or releasing agent. This can be performed in a safe manner even in containment tablet presses. In particular, the safety circuit according to the present invention can be connected to the safety elements of the present invention (shut-off valve, pressure sensors, evaluation in the control device) without interfering with the control logics of the dosing station.

As discussed in the preceding paragraphs, by feeding a lubricating or releasing agent to pressing tools, like pressing plungers or die bores, a novel solution is provided for different applications for users of tablet presses. As also explained supra, the application of this technology has hitherto not been possible in containment presses, inasmuch as continuous feeding of the lubricating or releasing agent was a risky procedure for operators. Depending on the operating condition of the lubricating or releasing agent, an additional opening would have been created through which a toxic product might leak out. On the other hand, the utilization of usual valve technology could interfere with the process if the feeding of the lubricating or releasing agent is not ensured at each moment, or it would endanger the operator if no safety-directed shut-off could be ensured. The present invention overcomes these problems as will be explained in more detail in the following.

In the present invention, at least the pressing chamber of the tablet press is exposed to a negative pressure or vacuum with respect to the surroundings. As explained in the preceding paragraphs, an active protection system for withholding toxic dusts is processed in the press by the surroundings. The negative pressure at least in the pressing chamber serves this purpose, so that any material processed in the pressing chamber will not leak out into the surroundings. Containment presses may be subdivided after the maximum admissible exposure to the material processed by the tablet press. The typical magnitude in the region of high containment presses is from 0.1 to 1 $\mu g/m^3$ as a mean value during a production shift.

The present invention enables the use of a lubricating or releasing agent without endangering the safety of an operator. The lubricating or releasing agent may be a stearate in particular, for instance MgSt. The lubricating or releasing agent is for instance pneumatically supplied from the dosing station to the pressing chamber via the feed pipe. For this purpose, the lubricating or releasing agent can be mixed with a gaseous transport medium, for instance air. This can be performed in the dosing station. In principle, the feed pipe can be formed by a hose line. An application device is provided in the pressing chamber, which supplies the lubricating or releasing agent to the pressing tools of the tablet press, for instance the press plungers or the die bores.

A pressure measurement is performed in the feed pipe and/or in the pressing chamber. A shut-off valve arranged on the feed pipe between the dosing station and the pressing chamber is only opened, and is only maintained in the open position, if there is an enable signal due to the pressure measurement. The enable signal ensures that during feeding the lubricating or releasing agent into the pressing chamber, no material compacted in the tablet press can inadmissibly leak out from the pressing chamber of the tablet press, in particular into the surroundings where workers are present. According to the present invention, the safety function of the containment press remains maintained at all times in spite of the potentially continuous supply of the lubricating or releasing agent.

The enable signal can be issued by a pressure measurement device and can be forwarded to the control device. However, it is also possible that the control device may output the enable signal in response to measurement values obtained from the pressure measurement device. The pressure measurement device and the control device may be separate devices or may be integrated or combined to produce a common pressure measurement/control device.

The supply of lubricating or releasing agents for dusting the pressing tools may be provided in a safe manner and with technically and constructionally justifiable efforts. This tableting method provides a high threshold for safety and the highest protection for its operators. Moreover, existing and/or commercially available lubricating or releasing agent dosing systems may be used in the containment presses. Heretofore, personal protection clothing was required for all containment presses employing external lubrication. Such protective garments made production significantly more difficult, laborious and hazardous for operators of such equipment.

The system according to the present invention may comprise a dosing station and/or a tablet press.

According to one embodiment, the pressure upstream of the shut-off valve and the pressing chamber pressure in the pressing chamber of the tablet press may be measured by a pressure measurement device. An enable signal will be issued or existent only if the pressure upstream of the shut-off valve is greater than the pressing chamber pressure by or about a given first limit pressure.

In the system, the pressure measurement device may comprise at least one first pressure sensor for measuring the pressure upstream of the shut-off valve, and at least one second pressure sensor for measuring the pressing chamber pressure in the pressing chamber of the tablet press. An enable signal will be issued only if the pressure upstream of the shut-off valve is greater than the pressing chamber pressure by or about a given first limit pressure.

In this embodiment, the pressure is measured upstream of the shut-off valve and the flow of the lubricating or releasing agent may be shut-off in response to the measured pressure. In order to measure the pressing chamber pressure, pressure sensors of the system may be provided. The control device of the system of this invention can then evaluate the measurement values of the pressing chamber sensor. Alternatively, it may also be possible to employ pressure sensors in the tablet press which are provided in the pressing chamber. It is also possible for the measured pressing chamber pressure to be evaluated by a machine control device of the tablet press or another partial system of the overall installation, and for a stop signal to be issued to the control device of the system when a limit pressure had been inadmissibly exceeded. When there is no stop signal with respect to the pressing chamber pressure, the pressure measured upstream of the shut-off valve may be higher than the pressing chamber pressure by or about the given first limit pressure.

According to a further embodiment, it may be possible for an enable signal to be issued or existent if the pressing chamber pressure does not exceed a given second limit pressure. Accordingly, in this embodiment it may be possible for the pressing chamber pressure to exceed an absolute (second) limit pressure. By monitoring a pressure switch, one which switches at a given absolute value, this embodiment may provide an additional safeguard, inasmuch as an unstable condition can occur if the pressure measured upstream of the shut-off valve is in fact higher than the pressing chamber pressure by or about the first limit pressure, but the pressing chamber pressure is inadmissibly high. Under these circumstances, the volume supplied via the feed pipe cannot be withdrawn from the pressing chamber at a sufficiently rapid rate or at a sufficiently high speed. Through this, the pressure in the pressing chamber can increase further, such that the sealing barriers of the pressing chamber can break, causing leak-out of toxic material into the surroundings in the worst case. This is reliably prevented by the aforementioned embodiment.

The dynamic pressure before the dosing device, or the pressure in the feed pipe between the dosing station and the shut-off valve, can be measured as the pressure upstream of the shut-off valve. The dynamic pressure before the dosing device is the pressure provided at the entrance of the dosing station, which is, for instance, due to the pneumatic system that is used for supply via the feed pipe. This dynamic pressure or the pressure before the shut-off valve, (but downstream of the dosing station) can be measured and taken into account with respect to the output of the enable signal.

According to a further embodiment, it may be provided that the dynamic pressure before the dosing device and the pressure in the feed pipe between the dosing station and the shut-off valve is measured as the pressure upstream of the shut-off valve. The enable signal is existent when the dynamic pressure before the dosing device and the pressure in the feed pipe between the dosing station and the shut-off valve are higher than the pressing chamber pressure by or about the given first limit pressure.

In the system of the present invention, the pressure measurement device may comprise at least two first pressure sensors, wherein the at least two first pressure sensors measure: (i) the dynamic pressure before the dosing device; and (ii) the pressure in the feed pipe between the dosing station and the shut-off valve as the pressure upstream of the shut-off valve. The enable signal may be issued or is existent only if the dynamic pressure before the dosing device, and the pressure in the feed pipe between the dosing station and the shut-off valve, is higher than the pressing chamber pressure by or about the given first limit pressure.

In this embodiment, the pressure in the feed pipe between the dosing station and the shut-off valve as well as the dynamic pressure before the dosing device are taken into account when making a comparison with the pressing chamber pressure. The enable signal exists only if both pressures are higher about the given first limit pressure than the pressing chamber pressure. Taking into account both pressures provides additional safety. For instance, in the event that the deviations with respect to the dosed lubricating or releasing agent occur in the dosing device, unexpected pressure changes may result downstream of the dosing station—in particular between the dosing station and the shut-off valve. This may not have been recognized if only the dynamic pressure before the dosing station were taken into account.

On the other hand, in case of changes to the feed pipe between dosing station and shut-off valve, for instance the plug-up of the lubricating or releasing agent, excessive pressure measurement values can occur in the feed pipe between dosing station and shut-off valve. This circumstance can be reliably recognized when the dynamic pressure before the dosing station is simultaneously taken into account. In that instance, both measured pressures must be higher, about the first limit pressure, than the pressing chamber pressure for the issuance of the enable signal.

The enable signal may be interrupted when the pressure conditions associated with issuing the enable signal no longer exist. Alternatively, it is also possible that the enable signal be issued in the absence of a locking signal. That is, the enable signal does not need to be positive signal itself. Rather, the absence of a locking signal can be defined as an enable signal. In this case, if a condition for the enable signal is lacking, or is no longer present, a locking signal may be issued, whereupon the shut-off valve will be closed. In contrast, therefore, as long as there is locking signal, the shut-off valve may be opened and remain opened.

In so far as absolute values of pressure signals are compared in the invention, this can take place by direct differential pressure measurement in particular. But it is also possible in so far as the pressure levels of the pressure sensors take place as differential pressure measurements with for instance the pressure of the surroundings, and are correlated in relation to each other.

The dosing station may comprise a dosing device which mixes a lubricating or releasing agent with a gaseous transport medium, for instance air. This gaseous transport medium can be supplied to the dosing station by means of a pneumatic device, for instance a corresponding pump. The mixture of lubricating or releasing agent and gaseous transport medium may then be supplied to the pressing chamber via the feed pipe. For this purpose, the dosing device may comprise a venturi nozzle to generate a negative pressure by narrowing the cross section of the nozzle, which then aspirates the lubricating or releasing agent to be mixed with the transport medium.

The pressing chamber of the tablet press can be sealed up with respect to its surroundings. Correspondingly, the feed pipe can be tightly connected to the pressing chamber with respect to the surroundings. The tightness is here in the frame of the requirements for the respective containment or high containment press.

The tablet press can be a rotary tablet press having a rotary driven rotor with a die table having a plurality of die bores arranged on a pitch circle. A pair of upper and lower plungers may be associated with each die bore and may be used as the pressing plunger. The pressing plungers compress powder-shaped material into tablets which has been filled into the die bores in the form of a powder.

The method of the present invention can be performed by the system of the invention. Correspondingly, the system of the invention can also be suited for exercising the method of the invention.

To the extent that the claims recite the phrase "at least one of" in reference to a plurality of elements, this is intended to mean at least one or more of the listed elements, and is not limited to at least one of each element. For example, "at least one of an element A, element B, and element C," is intended to indicate element A alone, or element B alone, or element C alone, or any combination thereof. "At least one of element A, element B, and element C" is not intended to be limited to at least one of an element A, at least one of an element B, and at least one of an element C.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for feeding a lubricating or releasing agent from a dosing station to one or more pressing took arranged in a pressing chamber of a tablet press, the tablet press having a feed pipe for feeding the lubricating or release agent from a dosing station to the one or more pressing tools of a pressing chamber of the tablet press, the feed pipe having a shut-off valve disposed in-line therewith for controlling a flow of the lubricating or release agent to the pressing chamber, the method comprising the steps of:

producing a negative pressure within the pressing chamber of the tablet press;

measuring a pressure in the feed pipe upstream of the shut-off valve;

measuring a pressure in the pressing chamber of the tablet press; and issuing an enable signal when the pressure stream of the shut-off valve is greater than the pressing, chamber pressure by a given first limit pressure.

2. The method according to claim 1, further comprising the step of issuing the enable signal when the pressure in the pressing chamber does not exceed a given second limit pressure.

3. The method according to claim 1, further comprising the step of measuring one of a dynamic pressure before the dosing station and the pressure in the feed pipe between the dosing station and the shut-off valve to measure a pressure upstream of the shut-off valve.

4. The method according to claim 1, further comprising the steps of:

measuring a dynamic pressure before the dosing station and the pressure in the feed pipe between the dosing station and the shut-off valve to measure a pressure upstream of the shut-off valve; and issuing the enable signal when the dynamic pressure before the dosing station and the pressure in the feed pipe between the dosing station and the shut-off valve is higher than the pressing chamber pressure by the given first limit pressure.

5. The method according to claim 1 further comprising the step of issuing the enable signal in the absence of a locking signal.

* * * * *

UNITED STATES PATENT AND TRADEMARK OFFICE
CERTIFICATE OF CORRECTION

PATENT NO. : 10,967,597 B2
APPLICATION NO. : 15/829266
DATED : April 6, 2021
INVENTOR(S) : Thomas Heinrich, Stefan Meisolle and Martin Schoeler Page 1 of 1

It is certified that error appears in the above-identified patent and that said Letters Patent is hereby corrected as shown below:

In the Claims

Claim 1:
Column 10
Line 3, replace "stream" with --upstream--

Signed and Sealed this
Fifteenth Day of February, 2022

Drew Hirshfeld
*Performing the Functions and Duties of the
Under Secretary of Commerce for Intellectual Property and
Director of the United States Patent and Trademark Office*